United States Patent [19]

Sudama et al.

[11] Patent Number: 5,619,657
[45] Date of Patent: Apr. 8, 1997

[54] METHOD FOR PROVIDING A SECURITY FACILITY FOR A NETWORK OF MANAGEMENT SERVERS UTILIZING A DATABASE OF TRUST RELATIONS TO VERIFY MUTUAL TRUST RELATIONS BETWEEN MANAGEMENT SERVERS

[75] Inventors: Ram Sudama, Hudson; David M. Griffin, Maynard, both of Mass.; Brad Johnson, Westerly, R.I.; Dexter Sealy, Boston, Mass.; James Shelhamer, Maynard, Mass.; Owen H. Tallman, Lunenburg, Mass.

[73] Assignee: Digital Equipment Corporation, Maynard, Mass.

[21] Appl. No.: 254,494

[22] Filed: Jun. 6, 1994

Related U.S. Application Data

[63] Continuation of Ser. No. 722,879, Jun. 28, 1991, abandoned.

[51] Int. Cl.$^6$ ............................ G06F 13/14; G06F 13/38
[52] U.S. Cl. ........................... 395/200.06; 395/200.12; 380/25; 380/49
[58] Field of Search ........................... 395/800, 200.12, 395/200.06, 186, 187.01, 188.01; 340/825.31, 825.34; 380/3, 4, 25, 49

[56] References Cited

U.S. PATENT DOCUMENTS

| | | | |
|---|---|---|---|
| 4,227,253 | 10/1980 | Ehrsam et al. | 380/45 |
| 4,326,098 | 4/1982 | Bouricius et al. | 380/25 |
| 4,525,780 | 6/1985 | Bratt et al. | 395/425 |
| 4,652,990 | 3/1987 | Pailen et al. | 380/4 |
| 4,656,579 | 4/1987 | Bachman et al. | 395/425 |
| 4,691,355 | 9/1987 | Wirstrom et al. | 380/23 |
| 4,780,821 | 10/1988 | Crossley | 395/650 |
| 4,799,061 | 1/1989 | Abraham et al. | 340/825.34 |
| 4,885,789 | 12/1989 | Burger et al. | 380/25 |
| 4,897,874 | 1/1990 | Lidinsky et al. | 380/3 |
| 4,908,861 | 3/1990 | Brachtl et al. | 380/25 |
| 4,919,545 | 4/1990 | Yu | 380/25 |
| 4,930,159 | 5/1990 | Kravitz et al. | 380/23 |
| 4,962,449 | 10/1990 | Schlesinger | 395/325 |
| 4,995,035 | 2/1991 | Cole et al. | 370/95.2 |
| 5,005,122 | 4/1991 | Griffin et al. | 364/200 |
| 5,012,515 | 4/1991 | McVitie | 380/49 |
| 5,032,979 | 7/1991 | Hecht et al. | 395/575 |
| 5,165,020 | 11/1992 | Sudama et al. | 395/200.12 |
| 5,204,961 | 4/1993 | Barlow | 395/187.01 |
| 5,224,163 | 6/1993 | Gasser et al. | 380/49 |
| 5,455,865 | 10/1995 | Perlman | 380/49 |
| 5,475,819 | 12/1995 | Miller et al. | 395/200.12 |

FOREIGN PATENT DOCUMENTS

| | | |
|---|---|---|
| 367699 | 5/1990 | European Pat. Off. . |
| 447038 | 9/1991 | European Pat. Off. . |

OTHER PUBLICATIONS

Anderson, D. P. et al. "A Basis for Secure Communication in Large Distributed Systems", IEEE Symposium on Security and Privacy, Apr. 1987, Oakland, US; pp. 167–172.

Gasser, M. et al.; "An Architecture for Practical delegation in a Distributed System"; Proceeding of the 1990 IEEE Computer Society Symposium on Research in Security and Privacy (Cat. No. 90CH2884-5); IEEE Computer Soc. Press, USA; May 1990; pp. 20–30 May 1990.

*Primary Examiner*—Larry D. Donaghue
*Assistant Examiner*—Mark H. Rinehart
*Attorney, Agent, or Firm*—Kenneth F. Kozik

[57] ABSTRACT

This invention consists of a method for providing security for distributing management operations among components of a computer network using a network of mutually trusting, mutually authenticating management services to dispatch operations to selected host systems. Mutual authentication and trust are established on every transmission link from a point of submission to a designated management server which invokes a service provider to perform management operations on a selected host.

10 Claims, 3 Drawing Sheets

METHOD FOR PROVIDING A SECURITY FACILITY FOR A NETWORK OF MANAGEMENT SERVERS UTILIZING A DATABASE OF TRUST RELATIONS TO VERIFY MUTUAL TRUST RELATIONS BETWEEN MANAGEMENT SERVERS

This application is a continuation of application Ser. No. 07/722,879, filed Jun. 28, 1991, now abandoned.

FIELD OF THE INVENTION

The present invention relates to networked data processing systems, and in particular, to methods for providing a security facility for remote systems management (RSM). RSM consists of performing system and application management functions over a network. For example, if creating an account is a system management function, then creating an account on a system over a network is a remote systems management function.

BACKGROUND OF THE INVENTION

Networked data processing systems provide several advantages over centralized data processing systems. First, distributed processing systems provide a means for efficiently executing information processing requests by system users by allocating the requests for service to a plurality of available network processing resources ("network resources"). The operating systems present at the interconnected nodes of the network cooperate to distribute workloads to readily available resources by transferring operation packets having descriptions of functions to be performed by network resources and data between many locations, referred to as nodes, in the network. Certain processes running on the network nodes, referred to hereinafter as "management servers", control the routing of data and requests for performance of functions by network resources between distinct local systems in the network running under the control of separate management servers.

Typically, processes operating on a local system (i.e. within the control of a single management server) are executed independently of network protocol. These processes are free to manipulate local data and make local decisions. However, when processes exchange information with each other over the network they communicate under the control of the network management servers.

The management servers implement network communication protocol for transferring data and requests for performance of functions by network resources between the nodes of the network. These management servers receive requests from sender nodes, place these requests on network request queues, and then forward the requests to the specified destinations according to a predetermined set of network operation rules. The rules enforced by the network management servers are determined by the network designer based upon the general and specific needs of the network. In cases where requests pass between network management servers, the transmitting network management server and the receiving network management server(s) generally must agree on an essential set of rules for communicating information.

A "management service" is a set of related processes that perform the functions specified in management operations. A management operation is a packet of information which specifies at least a function to be performed by a management service and the entity requesting performance of the function. In a networked data processing system, automated management services are provided in a de-centralized manner to large numbers of local systems in a network. Some of the nodes in the network consist of hosts for a management service. The hosts may themselves be algorithms, work stations, personal computers or other operating systems which use the services provided in the networked data processing system.

A universal database for the network maps the hosts to their designated management servers. The management servers coordinate the receipt and delivery of data and network resource requests to specified nodes according to the trusted links designated by the mapping function for each management server. A management operation is a data packet containing at least a description of the requested function to be performed by a network resource and the identity of the user who submitted the request. When a management server receives a management operation, the management server may either dispatch the management operation to a host coupled to a local service provider under the control of the management server or alternatively, the management server may transfer the operation to another management server. For example, a management server may dispatch a management operation to another management server which is coupled to a certain host and is designated to receive the operations for that particular host. This mapping function provided by the database is used for forwarding management operations from a point of origination management server, which is the point of submission of a request by a user for performance of a function by a network resource, to the designated management server for the host which, in turn, administers the management service described in the management operation.

The management servers in a network should execute system management, which includes network communication protocol, in the networked data processing system in a way that maintains the "security" of the local systems and of the communication links between the local systems. Network security has traditionally consisted of means to protect against unauthorized access to operations or data contained within the network. This type of security prevents unintentional as well as deliberate attempts to access information or network processing resources within the data processing network. Another important aspect of security is the assurance given to the sender of data or network requests that the recipient will not corrupt or make unauthorized use of the information transmitted by the sender. "Security" not only consists of restricting access to network resources, but also includes the guarantee that a data request will be handled and/or processed by an intended and reliable network resource. The network resource may, for example, be another network management server, a data storage system or a data processing system.

A "threat" to the security in a network is used herein to denote any activity which, if successful, will result in a breach of the security of the system. A threat, if not neutralized, may destroy, alter, duplicate or transmit without authorization information entrusted by a user to the network or gain access to restricted processing resources. These threats can be created by impostors or unauthorized processes operating within the network.

Prior network management security facilities depend on mechanisms that already exist in local operating systems and local network services to diminish the impact of threats to the systems in the network. Such mechanisms include passwords, access control lists, and proxies for providing a secure management environment. These protection tools adequately provide a safe environment in single management server systems. However, several problems are introduced when the system contains more than one management server and data or network requests must be transmitted between two or more management servers.

First, heterogenous management systems, i.e. ones containing local operating systems implementing inconsistent system security measures, cannot guarantee uniform protection of information transmitted between local systems in the network once the receiving management server gains control of the information. The security measures utilized by the receiving system may be inadequate or the receiving management server may in turn transfer the information to a non-secure network resource. Therefore, in a heterogenous management system, a sender must weigh the benefit of transmitting information to another system resource controlled by another management server against the possibility that the confidentiality of that information will be compromised after the receiving management server gains control of the information.

Second, some prior security mechanisms are not designed for RSM operations, and are not completely secure when used in an environment. For example, unencoded passwords may be intercepted when passed between two management servers. The interceptor may then use the password to gain unauthorized access to restricted network resources or information.

In addition, locating the source of a security breach is difficult if each local system management server possesses the capability of utilizing programming tools outside the domain of RSM to modify the security measures associated with its local operating system. In order to diagnose all weak links in the security of the network, the local security measures of each management server in the network must be reviewed. Therefore, not only are these prior art systems subject to consequences of local security breaches, the difficulty in identifying the source of the security breach increases as the size of the network becomes larger.

Therefore, known RSM security facilities which utilize local security mechanisms external to the management service may present significant problems to one wishing to maintain a secure network. Weak security measures used by a local system may not be apparent to other local operating system management servers or users who do not have information relating to the security measures adopted by the other local systems of the network. Identifying the source of a security breach is complicated in systems where non-uniform security rules are used by different local operating systems because diagnosis requires knowledge of each local system's security measures. This is a formidable task if the network consists of more than a few nodes. Furthermore, diagnosis and elimination of security threats is further complicated when local security measures may be changed outside the network operating environment by local operating systems.

Other approaches for providing security for RSM operations performed in a network environment depend on global user authentication. As an example, private-key encryption services in which keys are assigned to specific processes are frequently employed. This approach is suitable for small-scale environments, for example, in a configuration using a single management server for a limited number of host systems or when the management domains comprising a larger network environment are isolated and thus cannot be modified without permission by a network authorization procedure. However, even under these circumstances security is not guaranteed because management systems which permit the control of operations to span multiple systems are vulnerable to attack at any point where control is transferred between systems. A process on a given system may be authenticated—that is, may represent itself truthfully—but may be utilized by a hostile party impersonating an authorized user, i.e., a prior transfer of control may have been compromised. Accordingly, when multiple management servers interact to provide management services to a large-scale networked computing environment, such approaches fail to adequately address the security problem.

The desired solution to this problem is delegation which is the transfer of authenticated credentials between parties. Methods for secure and manageable delegation over a network spanning multiple systems, processes and users do not currently exist. Instead, conventional delegation relies upon forwarding authenticated credentials from one object to the next in the network. These credentials are subject to the threat of interception when passed among multiple systems.

SUMMARY OF THE INVENTION

The present invention overcomes the problems in prior art security facilities for networked data processing systems and maintains a secure network environment through the utilization of a semi-permanent form of delegation. The trust relations maintained in the global database in the present invention provide a semi-permanent form of delegation of authority between management servers. Therefore, once a user is authenticated to a management server, the management server acts under the user's authority to act on a host or set of hosts within the network subject to the limitations of the defined trust relations between the management servers in the network. The method according to the invention uses an internalized network security facility implementing link-wise protection of management operations transmitted between management servers in a network. The network facilitates secure transmission of a management operation on a network link between management servers by requiring a mutual trust relation to exist between the sending and the receiving management server (i.e. that transmission between the two management servers is allowed). As an added measure of security, the sender and receiver are each required to authenticate the other. Furthermore, a host withholds performance of the requested management operation until it authenticates the management server that submitted the management operation in order to ensure that the management server is the host's designated management server and verifies that the request originated from a trusted user.

The execution of link-wise, bi-directional authorization checks by each management server reduces the threat of an imposter management server taking control of a node and submitting management operations to restricted network resources because the trust relationship between neighboring management servers or a management server's relationship with a certain host must be known in order for the imposter management server to succeed in impersonating another management server.

Furthermore, the current invention reduces the difficulty in detecting and eliminating threats to network security by centralizing control over network security measures and providing a uniform set of rules for providing secure transmission of information between management servers. Centralization of security prevents local systems from singly compromising the security of the entire network since access to network resources from any given management server is limited by the previously established trust relationship with adjacent management servers. A uniform set of rules also reduces the amount of knowledge needed by a network administrator to modify the access privileges to various resources of the system.

The method according to the present invention executes a management operation created in response to a user request submitted to a network having a plurality of management servers, each management server coordinating receipt and delivery of management operations with either selected host systems or other management servers. The user is authenticated at the point of access. Simultaneously with authentication or shortly thereafter, the network accepts the user's management operation containing the user's identification and a description of the function to be dispatched by a management server to either a host or management server. The host system grants or denies performance of a function on a host based upon the user identity associated with the management operation.

A global database maintains and provides a list of hosts for performing specified functions, the hosts' designated management servers and trusted routing paths between the management servers. After a management operation is received by a management server coupled to the point of access, called the originating management server, the originating management server transfers the management operation to the designated management server coupled to the host specified by the database to perform the function described in the management operation or another management server constituting one of the linking processes on a predetermined route to the designated management server if the following conditions are satisfied: 1) a "trust relation" exists between the management servers participating in the forwarding operation; and 2) the management servers participating in the forwarding operation are mutually authenticated. A transmission between two management servers in a network will not occur unless the sender and receiver of the request are determined by each other to be valid parties for executing the transmission of the request. If the mutual authentication and trust relation is not established, the transfer of the management operation is aborted by either the sender or receiver. If the path from the originating management server to the destination management server involves more than a single transmission between management servers, the sender and receiver must satisfy the afore-described tests for each intermediate transmission on the trusted path between the originating management server and the designated management server.

Finally, when a host's designated management server presents a request for execution of an operation to a host, the following conditions must be satisfied before the host will fulfill the request: 1) the host and management server must be mutually authenticated; 2) the host must trust this management server to act as its designated management server; and 3) the user originating the operation must be authorized, according to the host's local authorization data, to request performance of the function described in the management operation.

Management operations may also originate from hosts instead of users. These operations are referred to hereinafter as composite management operations. In such cases the designated management server for the host submitting the management operation will forward the management operation, initially forwarded by the originating host to the designated management server, to the target host for performing the management operation. A secure path from the originating host's management server to the target host's management server is facilitated by the afore-described mutual authentication and trust relations. When the management server presents the management operation to the target host, the host verifies that the management operation was presented by an authorized management server and that the management operation was submitted by an authorized host.

DETAILED DESCRIPTION OF THE INVENTION

The present invention generally relates to a security facility for use in a networked data processing system. It is preferred that a network embodying the presently described invention possesses three basic utilities which would be well known to those of ordinary skill in the art. First, the user interface from which management operation requests are received must possess a reliable method for authenticating a user's identity. For instance, the system may require the user to submit a password in order to gain access to network resources. However, any other well known method for authenticating a user's identity may be adopted by a system embodying the present invention. Second, processes administered by one management server must possess a means to prove the authenticity of a process running on another system. For example, one well known method for authenticating processes is to utilize one of the several available key-based encryption systems to authenticate processes. Third, the management service which actually performs the function described within the operation packet preferably possesses the ability to define trust relations between the various processes cooperating to execute user requests on the network resources. This is preferably accomplished by means of trusted server tables which list valid senders to a given process and receivers from a given process.

Figure 1:
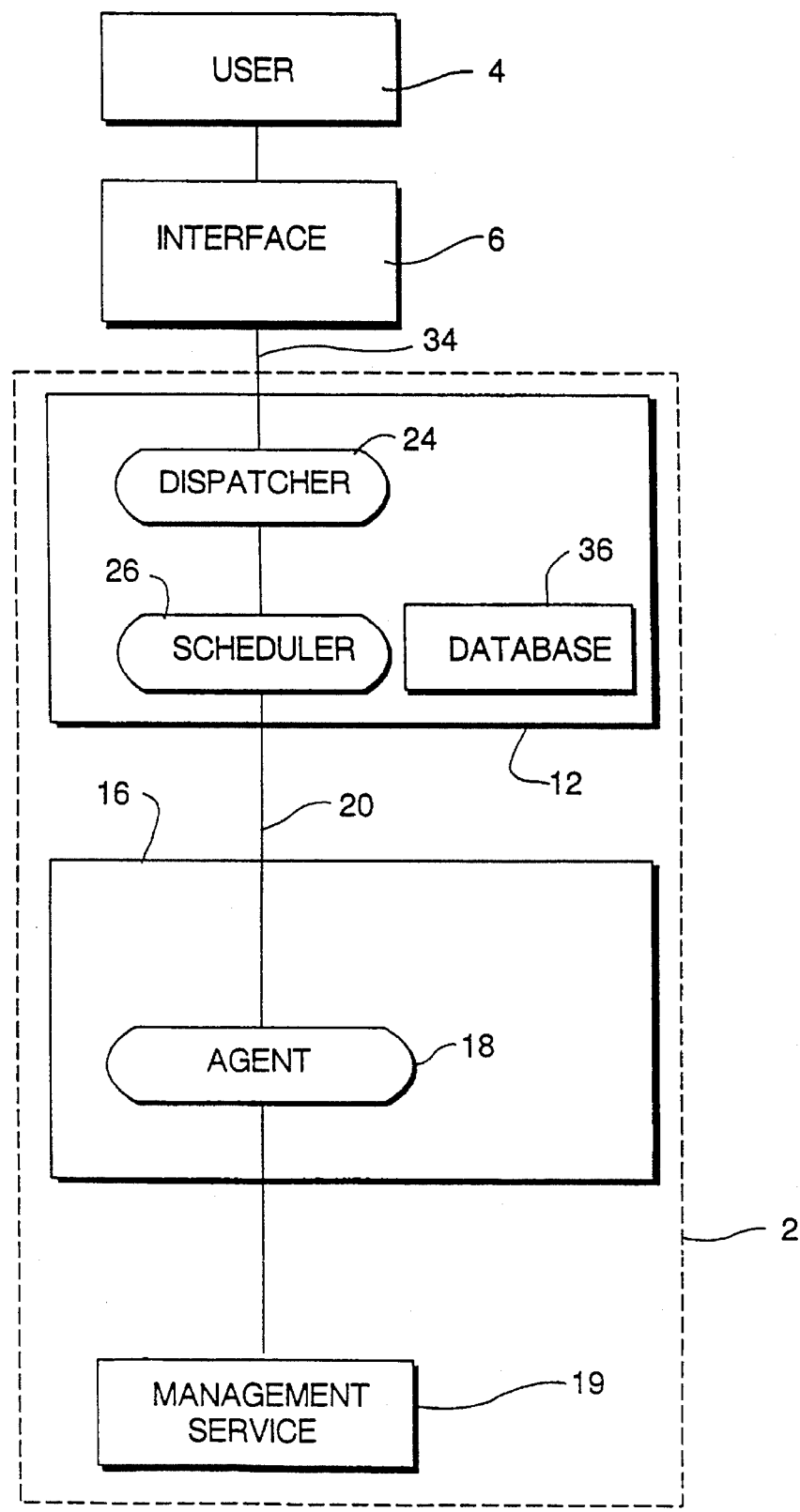
FIG. 1 is a block diagram of a distributed network system suitable for incorporating the present invention.

The present invention is particularly useful when incorporated into a remote system management (RSM) system which provides management services to a number of networked computing systems and processes in a network. FIG. 1 shows an illustrative representation of a local data processing system 2 suitable for use in a network embodying the present invention. FIG. 1 shows the relationship between a user 4 which generates a network management operation request, a management server 12 which receives, transfers and administers management operations, and a host 16 which provides a management service 19. The local system 2 generally operates in a network environment such as the one illustratively depicted in FIG. 2. The management server 12 provides the interface to other systems coupled to the local system 2 in a network. It should be understood that each of the components shown in FIG. 1 is embodied in computer software programs, processes, procedures and data packets and the description of the presently proposed embodiment is not intended to be confined to any particular system hardware.

The user 4 is a process created in response to a physical user's interactions with the network through an interface 6. The interface 6, outside the RSM domain, authenticates the user 4 and receives a management operation from the user 4. A management operation contains at least a description of a function to be transferred by cooperating RSM management servers to a designated management server for performance by an identified management service provided by a host 16. A management operation also contains the identity of the user requesting performance of the RSM function. Other fields contained in the operation packet not integral to the present invention would be well known to those of ordinary skill in the art. The interface 6 transfers the management operation to the dispatcher 24 of the management server 12 by means of the user-management server interface 34.

The dispatcher 24 receives and directs management operations to the designated management server for the management operation's target object (i.e. specified management service 19). If the operation is to be performed on the local system 2, then the management operation is transferred to the scheduler 26. The scheduler 26 queues and executes management operations and maintains operation state of the local system 2. Both the queuing operation executed by the scheduler 26 and the general forwarding operation executed by the dispatcher 24 consisting essentially of receiving an operation, determining its destination, and transferring the operations to an appropriate receiver are well known to those skilled in the art.

In general, the management server 12 is an RSM process which administers one or more management services 19 for selected hosts 16 in a network. The management server 12 coordinates appropriate control for transferring management operations to the host 16 for performance by a management service 19. The management server 12 may perform such services as: backup and restore, generic file distribution, maintenance of user accounts. The set of operations contained in a management service includes delivering and initiating network management operation requests and reporting the results to selected nodes in a network.

In FIG. 1, by way of example, the management server 12 is designated to administer management services provided by a single host 16 by means of a host-management server communication path 20. However, those of ordinary skill in the art will appreciate that in a typical distributed network system a management server will likely be coupled to several hosts. A host 16, as used herein, is a process or set of related processes which are performed on a network resource. Examples of network resources are stand-alone systems, time-sharing systems, workstations, and personal computers.

The host 16 communicates with the management server 12 by means of the host agent 18. The host agent 18 and the management server 12 communicate via the host-management server communication path 20. In general, the host agent 18 provides a means for communicating with the management server 12 in order to receive operation requests and return results of operations performed by a management service 19. The host agent 18 is the host-specific functionality which authenticates the designated management server 12 for the host 16 and authorizes the execution of functions specified in management operations. These processes are described more fully hereinafter. The management service 19 performs the function specified within the management operation.

The management server 12, in addition to administering requests for a management service 19 provided by the local system 2, is responsible for routing management operations on secure paths to other local systems in the network and maintaining the security of the local system 2. The management server 12 determines the proper link on which to forward the management operation by means of the database 36. The database 36 maintains and controls access to lists of trusted relations between the management servers. The trusted relation lists are generated independent from execution of the communication protocol by an autonomous network utility. These lists, though maintained by a global procedure, would preferably be stored and accessible locally by each management server in order to provide faster response to management operation transfer requests. Alternatively, trusted relations are cached by the local systems as they are established in order to further improve response in systems where the trust lists are not stored locally. These list maintenance procedures would be well known to those of ordinary skill in the art.

The lists provided by the database 36 can be divided into two categories: trusted receivers of the management operations and trusted senders. Thus, the sending and receiving management servers may verify the existence of a trust relation between the two management servers for each transmission of an RSM management operation on a link between two management servers. Thus, a sending management server will never forward a management operation to an untrusted management server, and a receiving management server will not process a management operation transmitted by an untrusted management server. In summary, the database 36 provides a means for routing management operations from one management server to another management server along a secure path determined by the trust relations of the management servers at each link in the route in the network performing the management operation.

In addition to the lists of trusted sending and receiving management servers, the database 36 provides a namespace which stores host names associated with specified management services as well as designated management servers for the specified hosts. This enables the database to provide trusted link information to management servers for forwarding an operation to a designated management server in response to the specified functions in a management operation.

Figure 2:
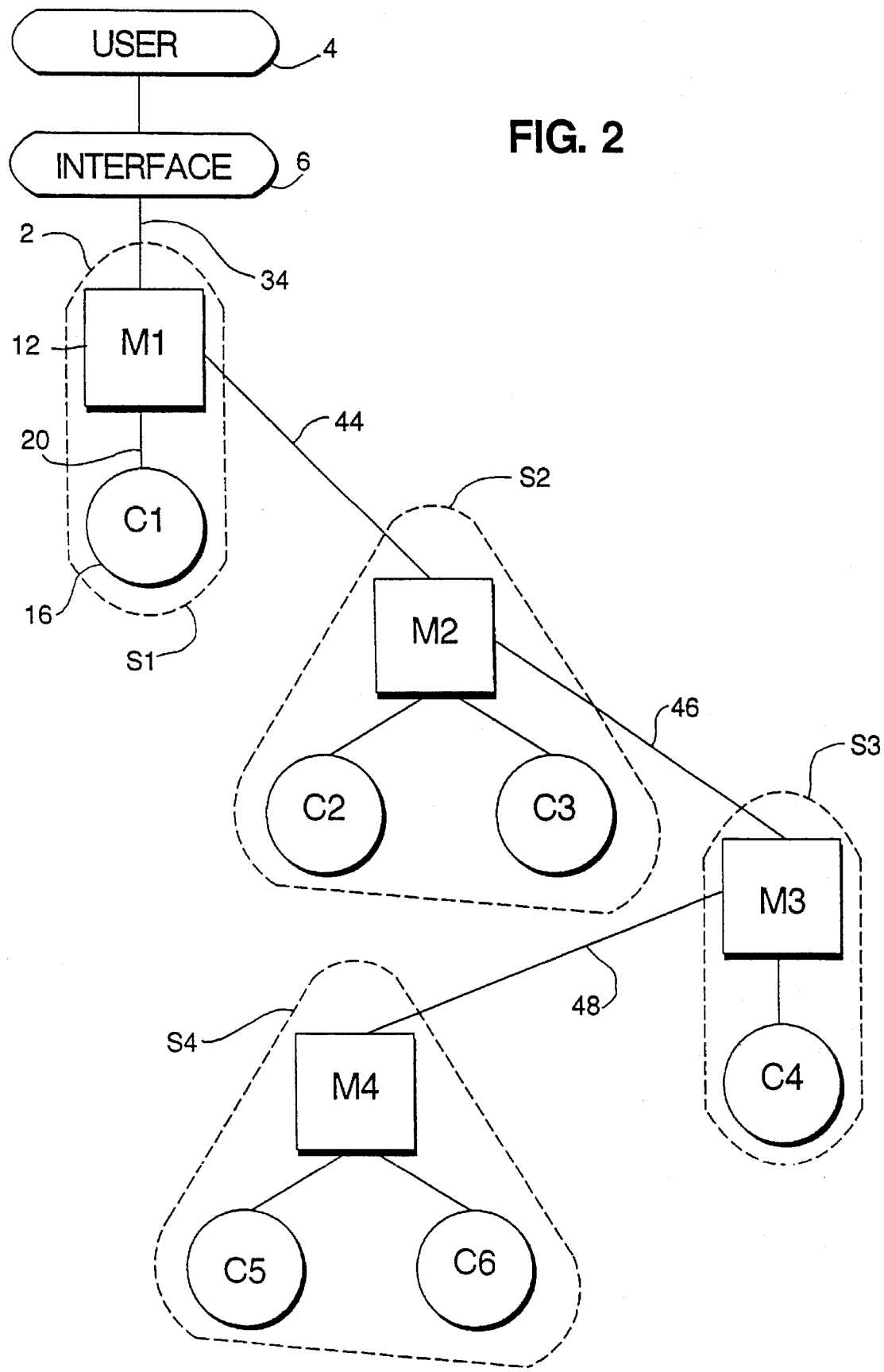
FIG. 2 is an illustrative diagrammatic representation of a number of management servers and hosts in a distributed network system which employs the teachings of the present invention.

FIG. 2 shows an illustrative network configuration of four (4) networked systems, S1–S4 for employing the security facility of the present invention. Each system S contains a single management server M and one or more hosts C. More particularly, the network in FIG. 2 consists of a number of host systems C1 through C6 with management servers M1 through M4 arranged in a hierarchical topology. Management operations can follow a trusted path downstream from M1 to M4, however, no trusted path exists for routing management operations upstream. For instance, M2–M4 cannot transmit a management operation to M1. Also, in this hierarchical topology, M4 cannot forward a request to any other management server M. The management server M1 administers management services for a host system C1 as well as transmissions to a second management server M2. The management server M2 administers management services for the hosts C2 and C3 as well as transmissions to a third management server M3. The management server M3 administers management services for a host system C4 as well as transmissions to a fourth management server M4, which in turn administers management services for hosts C5 and C6.

As shown in the illustrative network topology in FIG. 2, authorization to forward an operation from a particular sending management server to a particular receiving management server does not necessarily imply that the sender will accept management operations from that receiver. Furthermore, the network shown in FIG. 2 is presented merely as a means for facilitating the description of the method summarized by the flow chart in FIG. 3 for transmitting a user's management operation request to an appropriate management server M through a series of communicatively linked management servers M. It will be appreciated by one of ordinary skill in the art that the description of the particular multi-system network is not intended to limit the scope of the present invention.

Furthermore, mutual trust relations may be dictated by the network protocol for all senders and receivers in the network. If two management servers have a mutual trust relation then if a first management server has a trust relation defined with a second management server when the first management server is the sender and the second management server is the receiver, then a trust relation must also exist when the first management server is the receiver and the second management server is the sender. In such a case it is necessary only to maintain a single table defining mutual trust relations between management servers instead of separate tables for defining trusted sending relations and trusted receiving relations.

Figure 3:
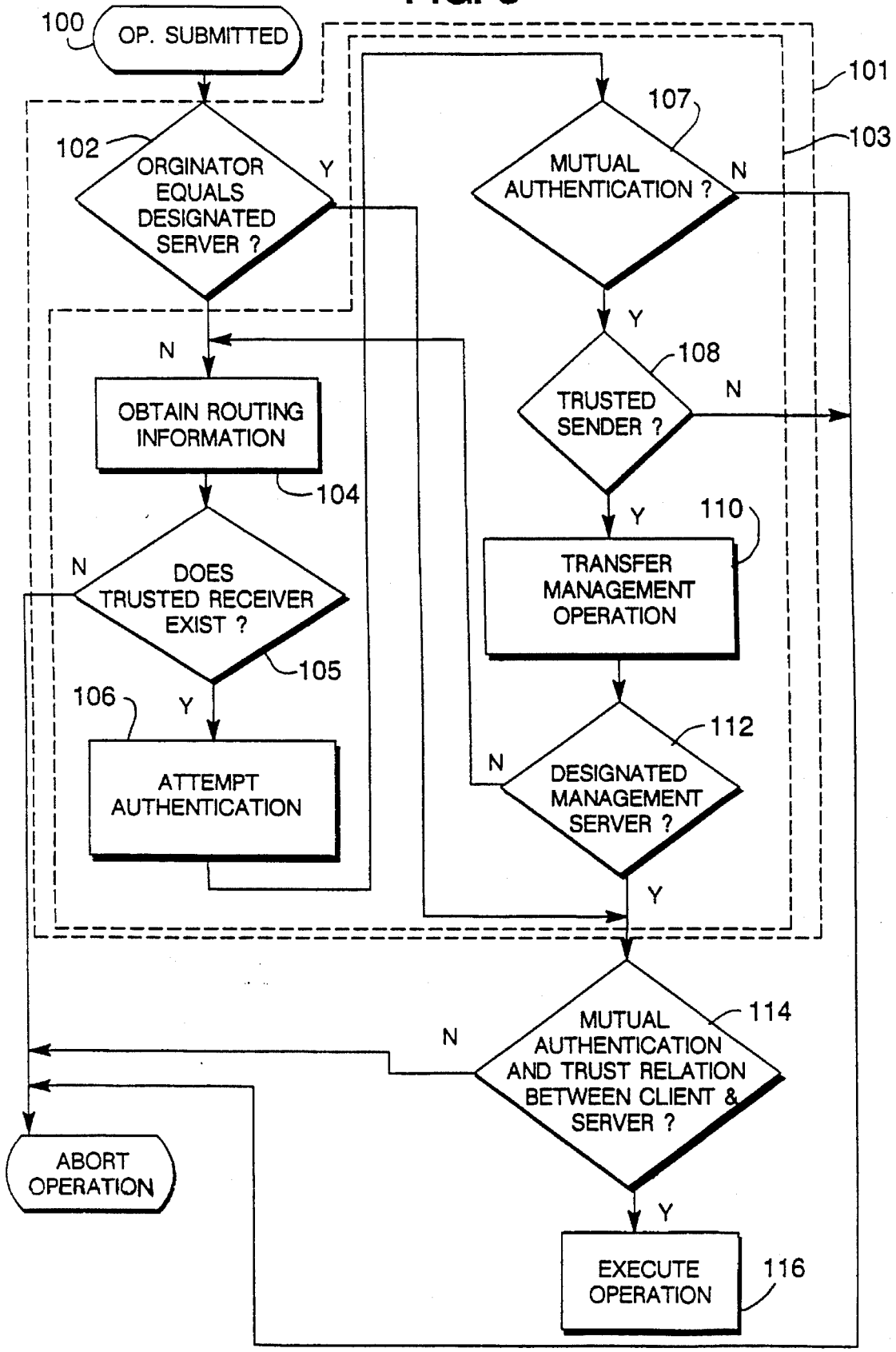
FIG. 3 is an illustrative flow chart of steps used to transfer and thereafter perform the execution of an operation according to the present invention.

Referring to the method described in FIG. 3 in conjunction with the network configuration in FIG. 2, the process for executing an RSM function performed by a management service administered by the host C4 and submitted at a user interface at M1 will be described in order to explain in detail the link-wise security measures provided by the current invention for RSM operations. The execution of a specified RSM function begins at step 100 with the submission of a management operation by the authenticated user to the user-management server interface. As explained earlier, a management operation describes a specific function to be dispatched by cooperating management servers and performed by a specified management service on a host.

After accepting the management operation, the management server M1 commences the "forwarding" procedure 101. Maintaining a secure path during the forwarding procedure is facilitated by two tasks executed by a sending and receiving management operation during every transmission of a management operation on a link: (1) mutual authentication; and (2) trust between management servers.

The management server M1, from which a management operation is first received from the user-management server interface is referred to as the "originating management server". The "designated management server" is the management server which administers the host for the specified management service. As previously noted, a "management service" is a set of related processes that perform the functions specified management operation.

At step 102 of the forwarding procedure 101, the originating management server M1 determines whether it is the designated management server for the management operation by means of the database 36. If the originating management server is also the designated management server, then control passes to step 114 and the forwarding loop 103 is by-passed. If, however, the originating management server is not the designated management server, then control passes to step 104. In the present example, since management server M1 is not the designated management server, control passes to step 104 of the forwarding procedure 101.

At step 104, the management server currently responsible for transferring the management operation to the next object, in this case the originating server M1, obtains routing information based upon the trusted relations between the objects maintained by the database 36 and the identity of the designated management server (M3) in order to transfer the management operation to the appropriate object which is either a host administered by the management server M1 or another management server. At step 105, the management server M1 queries the database 36 in order to determine whether a trusted management server exists for receiving the management operation on a trusted path to the designated management server. If no trusted receiving management server exists, then the forwarding procedure 101 is aborted. However, if a trusted receiver exists then the database 36 returns the identity of the trusted receiver for the management operation. Control then passes to step 106.

In the present example management server M2 provides the appropriate means for relaying a management operation on a "trusted" path from M1 to C4, and therefore control passes to step 106 wherein the management servers M1, M2 perform mutual authentication by any one of several well known acceptable means such as the key-based "Kerbesos" authentication service. System designers may prefer encryption based authentication schemes because unauthorized parties cannot appropriate legitimate user's keys by merely monitoring the messages transmitted between management servers M1, M2 during authentication. Other suitable authentication mechanisms would be known to those of ordinary skill in the art. After authentication has been attempted by the management servers M1, M2, control then passes to step 107 where the management servers M1, M2 independently determine whether or not mutual authentication has successfully occurred. If mutual authentication is unsuccessful, then the forwarding procedure 101 is aborted by either the intended sender or receiver. However, if the sending M1 management server and receiving M2 management server mutually authenticate one another's identities, then control passes to step 108.

The database 36 provides information relating to trusted sending management servers for each receiving management server. A receiving management server only accepts management operations from trusted sending management servers according to the trusted relations maintained by the database 36. At step 108, management server M2 queries the database 36 to determine whether the originating management server M1 is a trusted sender of management operations. The preceding method for mutually verifying sender and receiver management operations is exemplary. Other methods of verifying the existence of mutual trust would be known to those skilled in the art. If the database 36 informs the receiving management server M2 that management server M2 does not trust the sending management server M1, then the receiving management server M2 aborts the forwarding procedure 101. If, however, the receiving management server M2 trusts the sending management server M1, then control passes to step 110.

After the management servers M1 and M2 have authenticated one another and established that a trusted relation exists between the two servers M1, M2, at step 110 management server M1 transfers the management operation to management server M2 via a communication link 44 as illustrated in FIG. 2.

Since a management operation may pass through several management servers M before reaching the designated management server, at step 112 it is necessary for the receiver M2 to determine whether it is the designated management operation for the function identified in the management operation. If the receiving management server M2 is not the designated management server, then control passes to step 102 of the forwarding loop 103 and the management server M2 queries the database 36 in order to determine the next receiving management server on the trusted path to the designated management server. In the present example the forwarding process continues with management servers M2 and M3 authenticating one another and verifying the existence of a mutual trust relation between the sending management server M2 and the receiving management server M3 before transferring the management operation to the management server M3 via a communication link 46.

After the designated management server M3 receives the management operation at step 110, control passes to step 112 in the forwarding loop 103. The management server M3 determines that it is the designated management server for the host C4 for the management service specified to perform the function described in the management operation. Control then passes out of the forwarding loop 103 to step 114. If the designated host had been C5 or C6 instead of C4 then the management servers M3 and M4 would cooperate to execute an additional iteration of the forwarding loop 103 within the forwarding procedure 101 in order to transfer the management operation to M4 via a communication link 48.

The authentication step 106 of the forwarding procedure provides a means for protecting information transmitted on physically exposed transmission links such as telephone lines. Though this feature provides advantages in particular instances where the transmission links between management servers are not physically protected from eavesdropping devices, authentication is not a necessary element in all instances as will be appreciated by those skilled in the art.

Before the management operation can be transferred to the designated host C4, the host C4 and management server M3 authenticate one another and verify that a relation of mutual trust exists between the server and the host. This procedure is executed at step 114 in the method illustrated in FIG. 3. Thereafter, control passes to step 116 wherein the host C4 by means of a management service performs the function specified by the management operation provided the user is authorized to request performance of the function specified in the management operation.

For each management operation executed by a host 16, a process referred to herein as a host agent 18 checks the authorization of the user who submitted the operation before allowing a management service to perform the requested function. Authorization data is contained in a local database for each host 16 which maintains a list of users and the (classes of) operations and/or sets of privileges each user is permitted. The authorization database (not separately illustrated) for each host 16 is typically kept within the local address space of the host 16. By keeping the user authorization information within the local address space of the host 16, the host 16 has final say over protecting the integrity of the authorization data. Storing the data elsewhere exposes it to the danger of modification by unauthorized processes.

Performance of a management operation may involve a plurality of hosts C served by one or more management servers M. For example consider the management operation initially submitted to host C1, which in response to the request, submits a second management operation, which will be referred to hereinafter as a "command", to host C4. The management server M1 for the host C1 submitting the command to a second host C4 forwards the command according to the afore-described mutual authentication and trust relation procedures described in connection with FIG. 3. The second host C4, upon receiving the command, must check with its designated management server M3 to determine whether that command was authorized. The host C4 verifies the authorization by means of the authentication and authorization procedures in step 114 of the procedure illustrated in FIG. 3 and previously described in connection with a management operation submitted directly to a host C by an authenticated user. Thus, the second host C4 performs the function described by the command only after the host C4 determines that the command originated from an authorized management operation submitted by an authorized user through a trusted path through the network links. Since security is established on a link-wise basis, a trusted path is inferred merely by verifying that the command was received by the host C4 through its trusted management server M3. Additionally, the security of network transmissions is enhanced by having the management server M3 for the second host C4 query the management server M1 for the submitting host C1 to verify that the host C1 submitted the command to be performed by host C4.

Thus there has been described herein a method for providing a security facility to ensure that only authorized individuals are permitted to perform or receive specific management operations on specific systems, by providing a means for establishing a relation of mutual trust between a sender and a receiver of a block of data. It will be understood that changes in the details and arrangements of the processes that have been described herein may be made by those skilled in the art without venturing outside the principles and scope of the present invention as set forth in the appended claims.

What is claimed is:

1. A method for providing security for a data processing network having a plurality of management servers including at least an originating management server for providing a point of submission for a management operation to be performed from a user and a final management server coupled to a host designated to perform a function described in said management operation, and a database for storing data identifying the host designated to perform the function described in said management operation and containing a list of a plurality of links between said plurality of management sewers on a path from said originating management server to said final management sewer which forms a trusted path from said originating management server to said final management server for communicating management operations from said originating management server to said final management server, said method comprising the steps of:

receiving by a first one of said management servers on said trusted path between said originating management server and said final management server a management operation to be performed;

querying said database of trusted relations by said first management server to identify a second one of said management servers on said trusted path between said originating management server and said final management server that has a trusted relation to said first management server for sending said management operation by said first management server to said second management server;

mutually authenticating between said first management server and said second management server the identities of said first management server and said second management server;

querying said database of trusted relations by said second trusted management server to verify the existence of a mutual trusted relation with said first management server for receiving said management operation by said second trusted management server from said first management server; and sending said management operation to be management server to said second trusted management server.

2. A method for providing security for a data processing network having a plurality of management servers including at least an originating management server for providing a point of submission for a management operation to be performed from a user and a final management server coupled to a host designated to perform a function described in said management operation, and a database for storing data identifying the host designated to perform the function described in said management operation and containing a list of a plurality of links between said plurality Of management servers on a path from said originating management server to said final management server which forms a trusted path from said originating management server to said final management server, said method comprising the steps of:

receiving by said originating management server said management operation to be performed;

querying said database by said originating management server to identify said final management server and a first one of said plurality of management servers on said trusted path from said originating management server to said final management server for sending said management operation by said originating management server to said first management server;

mutually authenticating between said originating management server and said first management server the identities of said originating management server and said first management server;

querying said database of trusted relations by said first management server to verify the existence Of a mutual trusted relation with said originating management server for receiving said management operation by said first management server from said originating management server:

transferring said management operation from said originating management server to said first management server;

querying said database of trusted relations by said first management server to identify a second of said plurality of management servers on said trusted path from said first management server to said final management server for sending said management operation by said first management server to said second management server;

mutually authenticating between said first management server and said second management server the identities of said first management server and said second management server:

querying said database of trusted relations by said second management server to verify the existence of a mutual trusted relation with said first management server for receiving said management operation by said second management server from said first management server;

transferring said management operation from said first management server to said second management server;

querying said database of trusted relations by said second management server to identify said final management server on said trusted path from said first management server to said final management server for sending said management operation by said second management server to said final management server;

mutually authenticating between said second management server and said final management server the identities of said second management server and said final management server;

querying said database by said final management server to verify the existence of a mutual trusted relation with said originating management server for receiving said management operation by said final management server from said second management server; and transferring said management operation on the path between said second management server and said final management server.

3. The method of claim 2 further comprising the step of checking an authorization database by said host to verify authorization of said user to submit said management operation specifying said function to be performed by said host.

4. The method of claim 3 further comprising the step of querying said database of trusted relations by said host to verify the existence of a mutual trusted relation with said final management server for receiving said management operation from said final management server.

5. The method of claim 4 further comprising the step of mutually authenticating between said host and said final management server.

6. A method for providing security for a dam processing network having a plurality of management servers including at least an originating management server for providing a point of submission for a management operation to be performed from a user, a final management server coupled to a host designated to perform a function described in said management operation, at least one communicatively coupled intermediate management server linking said originating management server and said final management server, and a database for storing data identifying said host designated to perform said function described in said management operation and a list of links comprising a trusted path from said originating management server to said final management server, said method comprising the steps of:

receiving by said originating management server said management operation to be performed;

querying said database by said originating management server to identify said final management server and said trusted path from said originating management server to said final management server;

identifying by said originating management server an intermediate management server on said trusted path from said originating management server to said final management server for sending said management operation by said originating management server to said intermediate management server;

mutually authenticating between said originating management server and said intermediate management server the identities of said of said originating management server and said intermediate management server;

querying said database by said intermediate management server to verify the existence of a mutual trusted relation with said originating management server for receiving said management operation by said intermediate management server from said originating management server;

transferring said operation on a trusted link between said originating management server and said intermediate management server in accord with said trusted relations contained within said database;

querying said database by said intermediate management server to identify said final management server on said trusted path from said originating management server to said final management server for sending said management operation by said intermediate management server to said final management server;

mutually authenticating between said intermediate management server and said final management server the identities of said intermediate management server and said final management server;

querying said database by said final management server to verify the existence of a mutual trusted relation with said intermediate management server for receiving said management operation by said final management server from said intermediate management server; and transferring said operation on a trusted link between said intermediate management server to said final management server in accord with said trusted relations contained within said database.

7. The method of claim 6 wherein said at least one communicatively coupled intermediate management server includes at least two additional communicatively coupled intermediate management servers on said trusted path from said originating management server to said final management server, wherein said method further comprises the steps of:

querying said database by a first intermediate management server to identify a second intermediate management server for sending said management operation from said first intermediate management server to said second intermediate management server;

mutually authenticating between said first intermediate management server and said second intermediate management server the identities of said first intermediate management server and said second intermediate management server;

querying said database by said second intermediate management server to verify the existence of a mutual trusted relation with said first intermediate management server for receiving said management operation by said second intermediate management server from said first intermediate management server: and transferring said management operation on a trusted link between said first intermediate management server and said second intermediate management server in accord with said trusted relations contained within said database.

8. The method of claim 6 further comprising the step of checking an authorization database by said host to verify authorization of said user to submit said management operation specifying said function to be performed by said host.

9. The method of claim 8 further comprising the step of querying said database of trusted relations by said host to verify the existence of a mutual trusted relation with said final management server for receiving said management operation by said host from said final management server.

10. The method of claim 9 further comprising the step of mutually authenticating between said host and said final management server.

* * * * *